No. 770,384. PATENTED SEPT. 20, 1904.
E. R. POST.
BOLT AND NUT LOCK.
APPLICATION FILED JAN. 18, 1904.
NO MODEL.
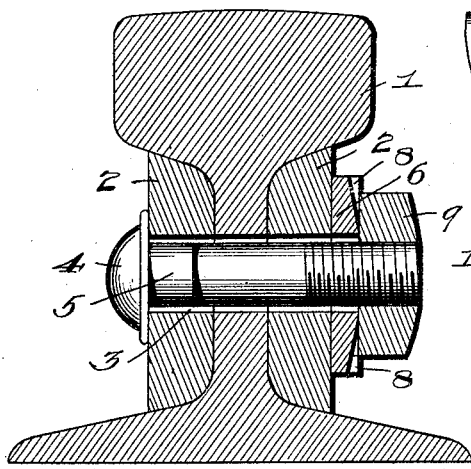
Fig. 1.
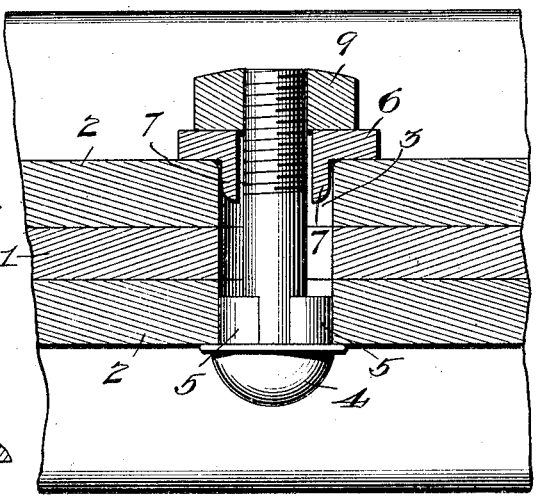
Fig. 2.
Fig. 3.
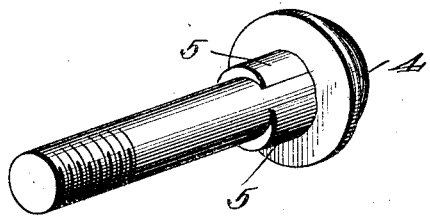
Fig. 4.
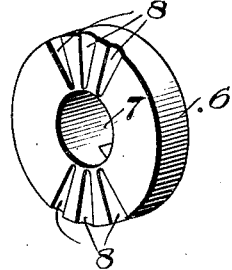
Fig. 5.
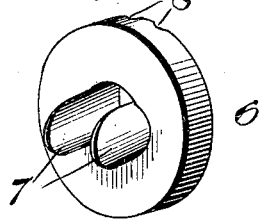
WITNESSES:
J. L. Mockabee
F. R. Bunyea.
INVENTOR
Edward R. Post,
BY Albert Popkins
his Attorney No. 770,384. Patented September 20, 1904.

UNITED STATES PATENT OFFICE.

EDWARD ROBERT POST, OF OTTAWA, OHIO.

BOLT AND NUT-LOCK.

SPECIFICATION forming part of Letters Patent No. 770,384, dated September 20, 1904.

Application filed January 18, 1904. Serial No. 189,561. (No model.)

*To all whom it may concern:*

Be it known that I, EDWARD ROBERT POST, a citizen of the United States, residing at Ottawa, in the county of Putnam and State of Ohio, have invented new and useful Improvements in Bolts and Nut-Locks, of which the following is a specification.

My invention relates to bolt and nut-locks, designed more particularly for use on rail-joints, but which may be used for other purposes.

One of the objects of my device is to provide means for preventing the bolt from turning within the aperture in the rail and fish-plates and to provide means for locking the nut upon the threaded end of the bolt.

With these ends in view my invention consists of a bolt having enlargements at opposite sides under the head to fit within an oval or oblong opening in the fish-plate and rail, and at the threaded end of the bolt a washer is provided having lugs upon its opposite sides which conform to some extent to the lugs upon the bolt to prevent the bolt from wabbling within the opening, said washer having a recess or number of recesses upon its face designed to catch a small portion of water during a rain or snow to thus provide means for forming a "rust-weld" with the nut turned upon the end of the bolt against said washer.

In the accompanying drawings, Figure 1 is a sectional view taken through the rail, the fish-plates, the nut, and the washer. Fig. 2 is a horizontal section of the same. Fig. 3 is a perspective view of the bolt. Fig. 4 is a perspective view of the washer looking at the face side thereof. Fig. 5 is a similar view looking at the rear face of the washer.

The numeral 1 designates a railway-rail of ordinary construction, and 2 represents the fish-plates. Passing through the fish-plates and rail is an elliptical or oblong opening 3. The bolt is provided with a head 4 and enlargements 5 upon opposite sides underneath the head, said enlargements designed to fit within the oblong opening 3 to prevent the bolt from turning. A washer 6 consists of a round or other shape body portion and having lugs 7 projecting from opposite sides of its central aperture to fit upon opposite sides of the bolt within the opening 3. Upon the face of the washer and upon opposite sides thereof are formed a series of recesses 8, said recesses being larger at the periphery of the washer and tapering toward the central opening therein. It will be noticed that these recesses do not extend entirely to the bore of the washer. When the nut 9 is turned upon the end of the bolt against the washer, the recesses 8, being at the top of the washer, will permit rain, snow, or ice in sufficient quantities to pass in said recesses to form rust or scale, and thus provide a rust-weld with the face of the nut and not permit the water to pass through the bolt.

It has been found in practice that one of the most reliable means for locking a nut upon a bolt is to permit it to rust thereon. However, it is undesirable for my purpose to have the nut rust to the bolt. Hence I have provided means for preventing the bolt from turning and also means for preventing the nut from turning by providing a rust-weld between the washer and nut and not between the bolt and nut. This will not prevent the necessary adjustment of the nut upon the bolt from time to time, as occasion may require, and at the same time providing means whereby the nut and the washer will be firmly united after such adjustment.

From the foregoing it will be obvious that my bolt and nut-lock is very simple in construction, efficient in operation, does not require special means for locking the nut to the washer, and may be quickly adjusted when required.

Having thus fully described my invention, what I claim is—

1. A nut-lock comprising a bolt having enlargements under its head to prevent it from turning within its seat, a washer consisting of a disk having a central opening for the bolt, lugs projecting from one face of the disk at opposite sides of the central opening, tapered rust-forming recesses upon the opposite face of the washer, said recesses extending from the periphery of the disk to a point short of the bolt-opening, and said recesses being only upon opposite sides of said bolt-opening, and a plain nut turned upon the bolt against the recessed face of the washer, substantially as described.

2. In a nut-lock, a bolt having enlargements under its head to prevent it from turning in its seat, a washer having a central opening for the bolt, lugs to prevent it from turning in the bolt-hole, a series of rust-forming recesses formed upon the face of the washer at opposite sides only of the central opening, and a plain-faced nut turned upon the bolt against the recessed face of the washer, substantially as described.

In testimony whereof I have signed my name to this specification in the presence of two subscribing witnesses.

EDWARD ROBERT POST.

Witnesses:
    ALBERT POPKINS,
    JOS. H. BLACKWOOD.